United States Patent [19]

Muramatsu et al.

[11] Patent Number: 5,732,550
[45] Date of Patent: Mar. 31, 1998

[54] CURRENT SUPPLY CONTROL SYSTEM OF ELECTRICALLY HEATED CATALYTIC CONVERTER OF INTERNAL COMBUSTION ENGINE

[75] Inventors: Hiroaki Muramatsu; Yuichi Shimasaki; Hiroaki Kato; Takashi Komatsuda; Akihisa Saito; Takuya Aoki; Tetsu Teshirogi; Hideo Furumoto, all of Wako; Takayoshi Nakayama, Haga-gun, all of Japan

[73] Assignee: Honda Giken Kogyo Kabushiki Kaisha, Tokyo, Japan

[21] Appl. No.: 674,693

[22] Filed: Jul. 2, 1996

[30] Foreign Application Priority Data

Jul. 4, 1995 [JP] Japan ................... 7-191244

[51] Int. Cl.⁶ .......................................... F01N 3/18
[52] U.S. Cl. .................. 60/274; 60/284; 60/285; 60/300
[58] Field of Search .................. 60/274, 276, 277, 60/284, 285, 300

[56] References Cited

U.S. PATENT DOCUMENTS

| | | | |
|---|---|---|---|
| 5,261,230 | 11/1993 | Yuuki et al. | 60/284 |
| 5,428,955 | 7/1995 | Yuuki et al. | 60/284 |
| 5,459,999 | 10/1995 | Hosoya et al. | 60/284 |
| 5,537,321 | 7/1996 | Yoshizaki et al. | 60/274 |
| 5,553,451 | 9/1996 | Harada | 60/284 |
| 5,560,202 | 10/1996 | Hosoya et al. | 60/284 |

FOREIGN PATENT DOCUMENTS

| | | |
|---|---|---|
| 1-232246 | 9/1989 | Japan . |
| 2-24550 | 1/1990 | Japan . |
| 7-34861 | 2/1995 | Japan . |

*Primary Examiner*—Willis R. Wolfe
*Attorney, Agent, or Firm*—Nikaido, Marmelstein, Murray & Oram LLP

[57] ABSTRACT

A current control system of an electrically heated catalytic converter installed in the exhaust system of an internal combustion engine. In the engine, fuel metering is controlled by correcting a basic quantity of fuel injection by correction factors. The correction factors are grouped into the factors for increasing the fuel injection quantity at engine warmup and other factors. Therefore, the total value of the factors for increasing the fuel injection quantity at engine warmup are compared with a predetermined value, and if the total value exceeds the predetermined value, the current supply to the heater is inhibited. Alternatively, the cranking time is compared with a predetermined value and if it exceeds the predetermined value, the current supply is inhibited. Since the quantity of fuel injection is increased in these situations, unburned emissions will accordingly be increase. With the arrangement, the exhaust temperature is prevented from rising excessively and the catalytic converter is prevented from being degraded or damaged.

15 Claims, 7 Drawing Sheets

CURRENT SUPPLY CONTROL SYSTEM OF ELECTRICALLY HEATED CATALYTIC CONVERTER OF INTERNAL COMBUSTION ENGINE

BACKGROUND OF THE INVENTION

1. Field of the Invention

This invention relates to a system and a method for controlling current supply of an electrically heated catalytic converter installed at the exhaust system of an internal combustion engine.

2. Description of the Related Art

An internal combustion engine usually has a three-way catalytic converter in the exhaust system which reduces all three types of CO, HC, and NOx emissions that escape through the exhaust system, and which removes pollutants from the exhaust gases in the engine exhaust system. However, the catalyst is ineffective or inactive until its temperature has risen to a high temperature. It takes a long time until the catalytic converter has heated up to the necessary temperature from, for example, cold engine starting. For that reason, a catalytic converter having an electric heater that heats the catalyst to promote the activation is nowadays used.

The electrically heated catalytic converter is configured to have an electric heater in the vicinity of a carrier that carries a catalyst or to have such a carrier that is inherently manufactured as an electric heater. The heater is supplied with current and heats up by resistance heating. The heater thus supplied with current burns off the unburned exhaust gases generated by the engine and passing through the engine exhaust to promote the activation of the catalytic converter itself and other ordinary catalytic converter(s) installed downstream thereof.

In the engine exhaust system, when the amount of unburned components are large, the temperature of combustion rises accordingly thus raising the ambient temperature of the exhaust system, shortening the service life of, or damaging, the carrier made of a metal mesh carrying the catalyst. For that reason, Japanese Laid-Open Patent Application No. 7(1995)-34,861 proposes to discontinue or inhibit the current supply to the heater of the catalytic converter, when the engine experiences misfiring, ignition timing retarding or difficulty in engine starting.

However, engine operation under which an amount of unburned components in the exhaust gases is produced are not limited to the above conditions. For example, cold engine starting requires a relatively great quantity of fuel injection, increasing the unburned components in the exhaust gases. The prior art can not cope with such engine operating conditions.

An object of the invention is therefore to solve the drawback of the prior art and to provide a system and a method for controlling current supply of an electrically heated catalytic converter of an internal combustion engine, which inhibits the supply of current to the electrically heated catalytic converter under the engine operating conditions in which the quantity of fuel injection is relatively great such that the ambient temperature of the engine exhaust system is increased, thereby preventing the catalytic converter from being damaged or shortened in service life.

SUMMARY OF THE INVENTION

In order to achieve the object, the present invention provides a system for controlling current supply to an electrically heated catalytic converter of an internal combustion engine, comprising a catalytic converter installed in an exhaust system of the engine for reducing pollutants from exhaust gases emitted from the engine, the catalytic converter having a heater, a power source, current supplying means for connecting the power source to the heater of the catalytic converter to supply current thereto, fuel injection quantity determining means for determining a basic quantity of fuel injection, correction factor determining means for determining correction factors for correcting the basic quantity of fuel injection, output fuel injection quantity determining means for determining an output quantity of fuel injection to be supplied to the engine based on the basic quantity of fuel injection and the correction factors, discriminating means for discriminating whether at least one of the correction factors is greater than a predetermined value, and current supply inhibiting means for inhibiting the current supply to the heater of the catalytic converter when said at least one of the correction factors is greater than the predetermined value.

BRIEF DESCRIPTION OF THE DRAWINGS

The above and other objects and advantages of the invention will be more apparent from the following description and drawings, in which.

DESCRIPTION OF THE PREFERRED EMBODIMENTS

Embodiments of the invention, given by way of example only, will now be explained with reference to the drawings.

Figure 1:
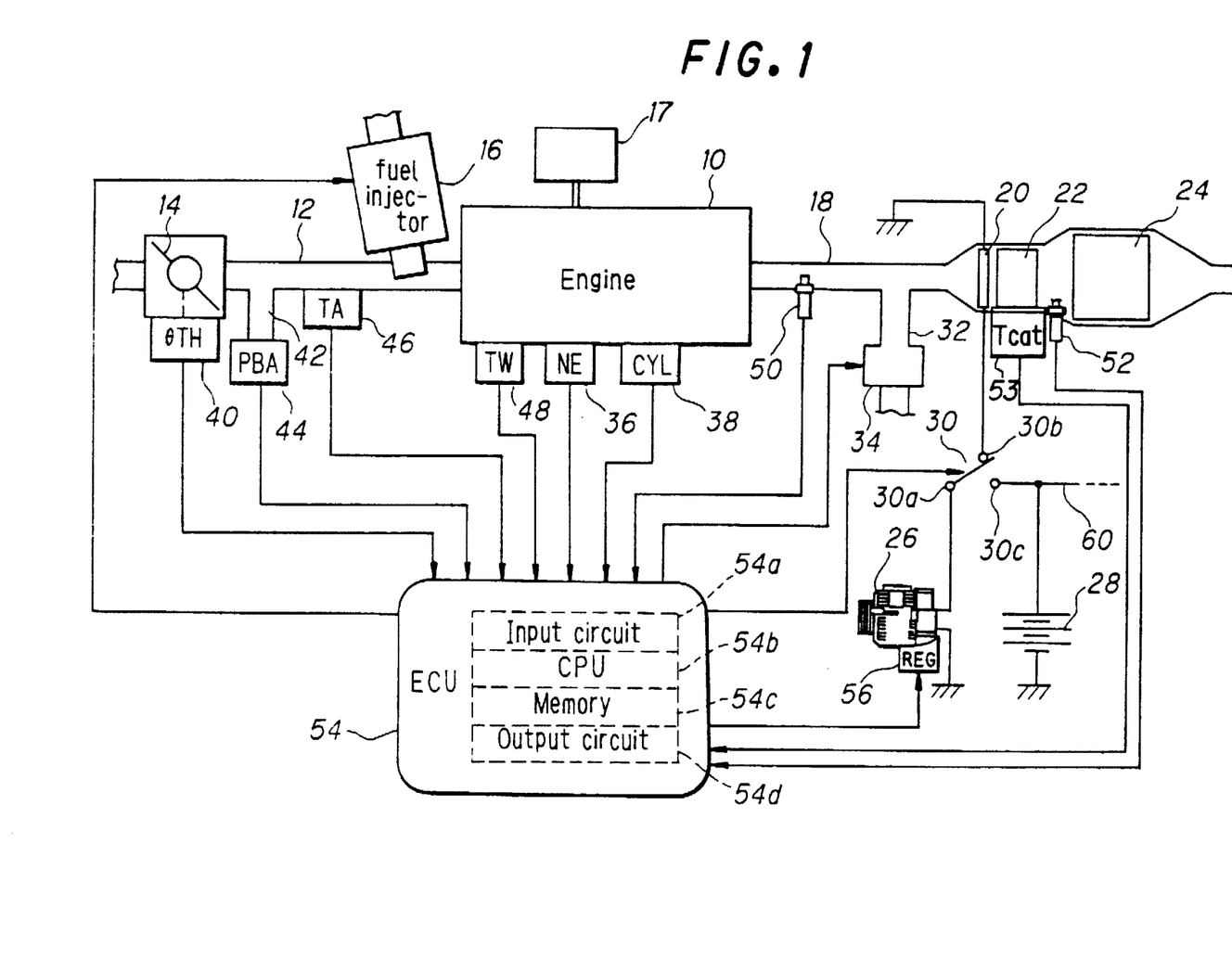
FIG. 1 is an overall schematic view showing a current supply control system of an electrically heated catalytic converter installed at the exhaust system of an internal combustion engine according to the invention as well as the fuel metering control system of the engine.

FIG. 1 is an overall schematic view showing a current supply control system of an electrically heated catalytic converter installed at the exhaust system of an internal combustion engine according to the invention, as well as the fuel metering control system of the engine.

Reference numeral 10 in this figure designates a multi-cylinder engine such as a four-cylinder internal combustion engine. Air drawn into an air intake pipe 12 through an air cleaner (not shown) mounted on a far end thereof is supplied to each of the first to fourth cylinders through a surge tank and an intake manifold (neither shown), while the flow thereof is adjusted by a throttle valve 14 provided in the air intake pipe 12. A fuel injector 16 for injecting fuel is installed in the vicinity of intake valves (not shown) of each cylinder of the engine. The injected fuel mixes with the intake air to form an air-fuel mixture that is ignited in the associated cylinder by a spark plug (not shown). The resulting combustion of the air-fuel mixture drives a piston (not shown) down. The engine is cranked by a cranking motor 17 (starter) at the time of starting.

The exhaust gas produced by the combustion is discharged through exhaust valves and an exhaust manifold (neither shown) to an exhaust pipe 18. The exhaust pipe 18 is installed with, in order from the upstream side (in terms of exhaust gas flow), the aforesaid electrically heated catalytic converter (hereinafter referred to as "EHC") 20 having a heater (not expressly shown), a start catalytic converter 22 and a three-way catalytic converter 24, which burn off the remaining HC, CO, and NOx emissions in the exhaust gases which escape from the cylinders thus reducing pollutants in the exhaust gases from the engine exhaust system. The start catalytic converter 22 (known as a "light-off catalyst") is configured to have a relatively small diameter and volume and is provided in particular for enhancing catalyst conversion efficiency immediately after engine starting.

Figure 2:
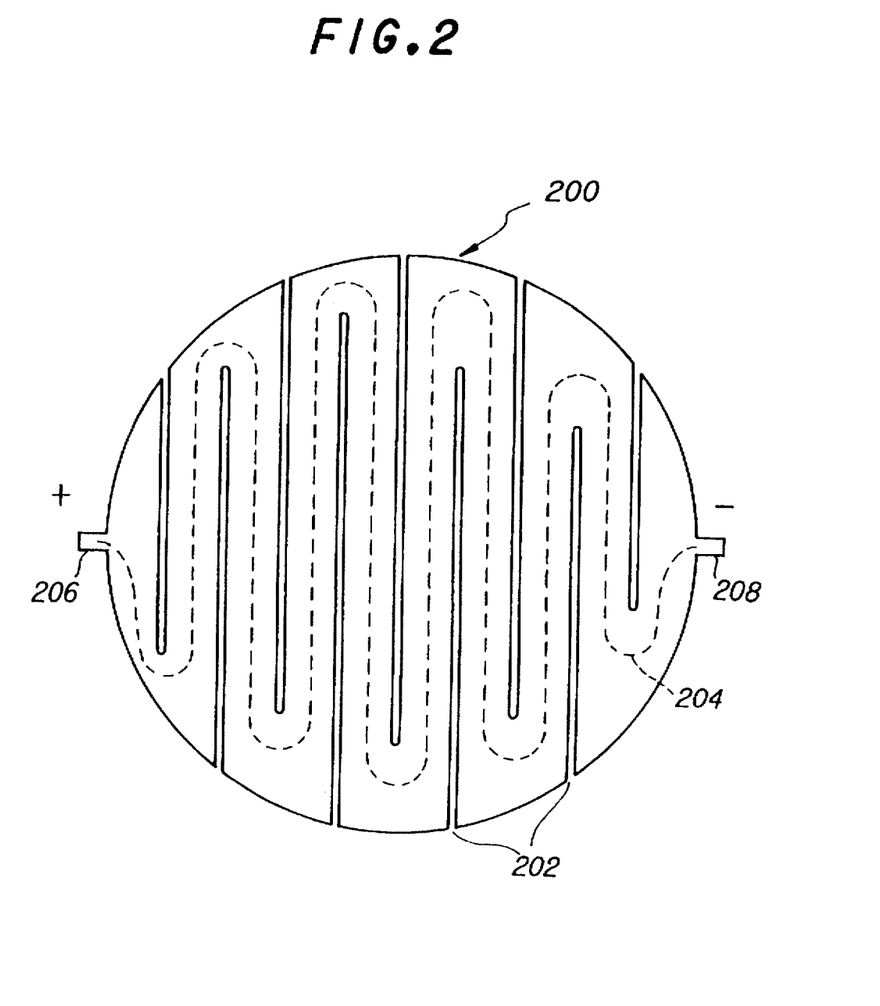
FIG. 2 is an explanatory plan view of a carrier that carries the catalyst of the catalytic converter illustrated in FIG. 1.

The body of the EHC 20, i.e., a carrier that carries the catalyst, is made of a metal mesh. The metal mesh is manufactured by extruding metallic materials, then by sintering them to a ceramic bar, and then by cutting the bar into disc-shaped slices of 10 cm thickness. As illustrated in FIG. 2, the metal mesh 200 is provided with slits 202 for a current supply path 204 therebetween. Thus, the metal mesh itself is configured to be an electric heater. The current path has an anode 206 and a cathode 208 at opposite ends thereof.

As illustrated in the figure, an alternator 26 is provided in the vicinity of the engine 10. The alternator 26 is connected to the crankshaft (not shown) of the engine 10 and is driven to produce electric power. The generated electric energy is supplied to the EHC 20 or a battery 28. More specifically, a switch 30 is inserted in the current supply circuit. When terminals 30a and 30b are connected, the anode of the metal mesh (heater) of the EHC 20 is connected with the alternator 26 to be supplied with current for heating up. As a result, the heated EHC 20 burns off the remaining emissions generated immediately after the engine starting. The EHC 20 further heats up with the heat generated by the chemical reaction of the burning and promptly reaches the activation temperature, thereby promoting the start catalytic converter 22 and the three-way catalytic converter 24 installed downstream thereof to activate.

The exhaust pipe 18 is connected with a conduit 32 which has an air pump 34 at the opposite end for supplying secondary air. Since a large amount of unburned gases are produced at engine starting, the air pump 34 is installed to supply air to the exhaust pipe 18 to promote burning, thereby enhancing conversion efficiency of the catalysts.

A crankshaft position sensor 36, illustrated as "NE" in the figure, is provided on the camshaft or crankshaft (neither shown) which produces a signal once per predetermined crank angular position. A camshaft position sensor 38, illustrated as "CYL" in the figure, is similarly provided on the camshaft (not shown) which produces a signal at a prescribed crank angular position of the first cylinder. A throttle position sensor 40, illustrated as "θTH" in the figure, is connected to the throttle valve 14 to detect, and to generate a signal indicative of, the degree of opening of the throttle valve 14.

The air intake pipe 12 is branched off downstream of the position where the throttle valve 14 is placed, to have a branch 42. A manifold absolute pressure sensor 44, illustrated as "PBA" in the figure, is installed at the far end of the branch 42, to detect, and to generate a signal indicative of, the intake manifold pressure downstream of the throttle valve 14 in terms of absolute pressure.

In addition, the air intake pipe 12 is provided with an intake air temperature sensor 46, illustrated as "TA" in the figure, for detecting, and for generating a signal indicative of, the temperature of the intake air; and an engine coolant temperature sensor 48, illustrated as "TW" in the figure, for detecting, and for generating a signal indicative of, the temperature of the engine coolant is provided at a suitable location on the engine 10.

On the other hand, the exhaust pipe 18 is provided with, upstream of the intersection where the conduit 32 is connected, a first oxygen sensor 50 comprising an $O_2$ sensor for detecting, and for generating a signal indicative of, the oxygen content in the exhaust gases. The exhaust pipe 18 is further provided with a second oxygen sensor 52 similarly comprising an $O_2$ sensor, at a position between the start catalytic converter 22 and the three-way catalytic converter 24. A temperature sensor 53, illustrated as "Tcat" in the figure, is provided in the proximity of the second $O_2$ sensor 52 to detect, and for generating a signal indicative of, the exhaust system ambient temperature.

The first and second $O_2$ sensors are respectively provided with a heater which heats up a detection element comprised of a special ceramic core, upon receipt of current from current supply circuits (neither shown). Since the structure and configuration of the $O_2$ sensors of this kind are known from prior art references such as Japanese Laid-Open Patent Application Nos. Hei 1(1989)-232,246 and Hei 2(1990)-24,550, no further explanation thereof will be made.

The signals outputted from the sensors are sent to a control unit 54 that is illustrated as "ECU" in the figure.

The ECU 54 comprises a microcomputer made up of an input circuit 54a, a CPU 54b, a memory 54c and an output circuit 54d. The input circuit 54a carries out various procedures including shaping some sensor signal waveforms, converting some sensor signals to predetermined levels in voltage, and converting some analog sensor signals into digital values. The memory 54c stores various data including calculation programs and the results of the calculations in response to the instructions made by the CPU 54b.

The CPU 54b operates, via the switch 30, to connect the alternator 26 to the EHC 20 to supply current thereto in response to the detected parameters. The alternator 26 has a regulator 56. The CPU 54b determines and outputs a pulse train indicative of a duty cycle in a pulse-width modulation control such that the alternator 26 produces the electric power at a level determined by the duty cycle.

In the switch 30, on the other hand, when the terminal 30a is switched to connect with the terminal 30c, the alternator 26 is connected with the battery 28 to charge it. The battery 28 is connected, through a line 60, to various electric loads including an electric motor (not shown) of the air pump 34. The CPU 54b controls the operation of the air pump 34 by controlling the operation of the motor, and controls fuel metering through the fuel injector 16. More specifically, the CPU 54b determines the amount of fuel injection (the amount of fuel supply) in terms of time and controls the fuel injector 16 to open for the determined time.

Figure 3:
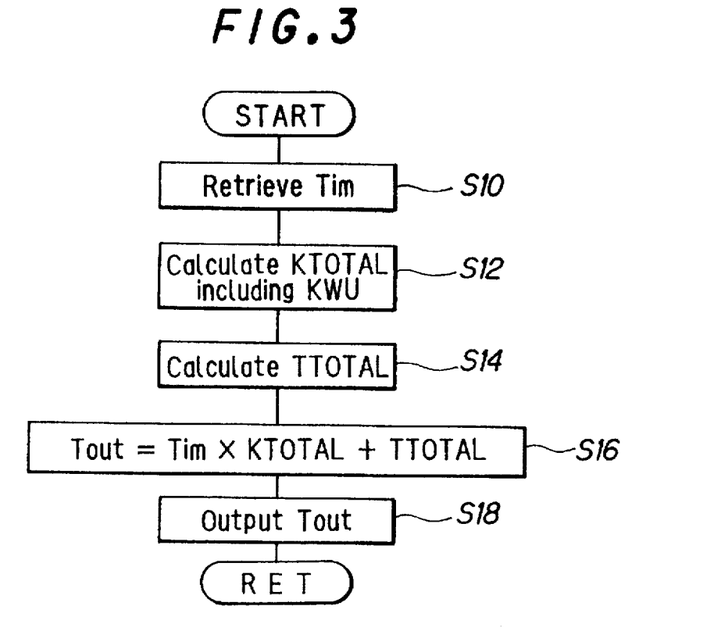
FIG. 3 is a flowchart showing the operation of the fuel metering control system illustrated in FIG. 1.

FIG. 3 is a flowchart illustrating the fuel metering control just mentioned.

Explaining this, the program begins at S10 in which a basic quantity of fuel injection Tim is determined by retrieving mapped data stored in the memory 54c using the detected engine speed NE and the manifold pressure PBA indicative of the engine load.

The program then proceeds to S12 in which various correction factors obtained as multiplication terms and generally named as KTOTAL are calculated (explained later), to S14 in which a similar correction factor obtained as a sum of addition terms including a correction factor due to atmospheric pressure is calculated, to S16 in which an output quantity of fuel injection Tout is calculated in the manner shown there as the opening period of the fuel injector 16, and to S18 in which the calculated output quantity of fuel injection Tout is outputted, as a command, to a driver circuit (not shown) of the fuel injector 16. The dead time of the fuel injector 16 is added the command.

In the above, the correction factors KTOTAL obtained as multiplication terms are classified into two groups. The first group includes the correction factors for increasing the basic quantity of fuel injection at engine warming up and the second group includes the correction factors other than those for engine warmup enrichment. The correction factors for increasing the basic quantity of fuel injection include the following:

a correction factor due to the engine coolant temperature (hereinafter named as KTW);

a correction factor due to the intake air temperature (hereinafter named as KTA); and a correction factor due to engine cranking (hereinafter named as KCR).

Those factors are known in the art. Since they are defined as multiplication terms (e.g., KTW=1.1, KTA=1.3, . . . ), they can be multiplied with each other and the resultant product can generally be defined as a single correction factor for increasing the fuel injection quantity at engine warmup. The value is hereinafter named as the "engine warmup enrichment correction factor KWU".

On the other hand, the correction factors falling in the second group, i.e., the correction factors other than KWU, include:

a correction factor for increasing the basic quantity of fuel injection at acceleration (KACC if named);

a correction factor due to battery voltage drop (KVB if named); and a correction factor due to air/fuel ratio error determined based on the outputs of the O$_2$ sensor (KO2 if named).

Next, the operation of the current supply control system, more specifically, the operation of the system to determine the bit of a flag indicating that the current supply to the EHC is to be inhibited or not, will be explained with reference to the flowchart of FIG. 4. The program disclosed here is looped at a predetermined interval.

The program starts at S20 in which it is checked whether the engine warmup enrichment correction factor KWU is greater than a predetermined value Kref (for example 2.0). When it is found in S20 that the factor KWU exceeds the predetermined value Kref, the program proceeds to S22 in which the bit of a flag FEHC is reset to zero. On the other hand, when S20 finds that KWU does not exceed Kref, the program goes to S24 in which the bit of the flag is set to 1. As will be explained later, resetting the flag bit to zero means that current supply is inhibited.

Next, the current supply control to the EHC 20 will be explained with reference to a flowchart shown in FIG. 5.

First, in S100, it is checked whether the ignition switch (not shown) is turned ON, more specifically if it is being turned ON and when the result is negative, the program goes to S102 in which current supply to the heater of the EHC 20 is inhibited or not performed. If affirmative, the program proceeds to S104 in which it is checked whether the bit of the flag FEHC is set to 1. When the result is negative, the program goes to S102 in which no current is supplied to the heater of the EHC 20.

Thus, when the engine is being warmed up and the engine warmup enrichment correction factor KWU exceeds the predetermined value Kref, in other words, when the quantity of fuel injection is relatively large, the current supply to the heater of the EHC 20 is inhibited or not performed. With the arrangement, the EHC heater does not heat up.

If the EHC heater is supplied with current and heats up, the heated EHC will burn off the unburned emissions produced by the engine and will further heat up with the heat generated by the chemical reaction of the burning. Since the quantity of fuel injection is increased in engine warmup so that the amount of unburned emissions is increased, the ambient temperature rises excessively. As a result, the metal mesh 200 of the EHC 20, and/or the start catalytic converter 22 and the three-way catalytic converter 24, are exposed in the high temperature, rendering them vulnerable to degradation or damaged.

With the arrangement, however, since the EHC 20 is not supplied with current at fuel enrichment in engine warmup, such a disadvantage will not occur. The predetermined value Kref should therefore be determined, from the reverse of the above, as sufficient for discriminating the engine operation in which the exhaust system ambient temperature rises so high that the EHC 20, etc., are liable to be degraded or damaged.

Figure 5:
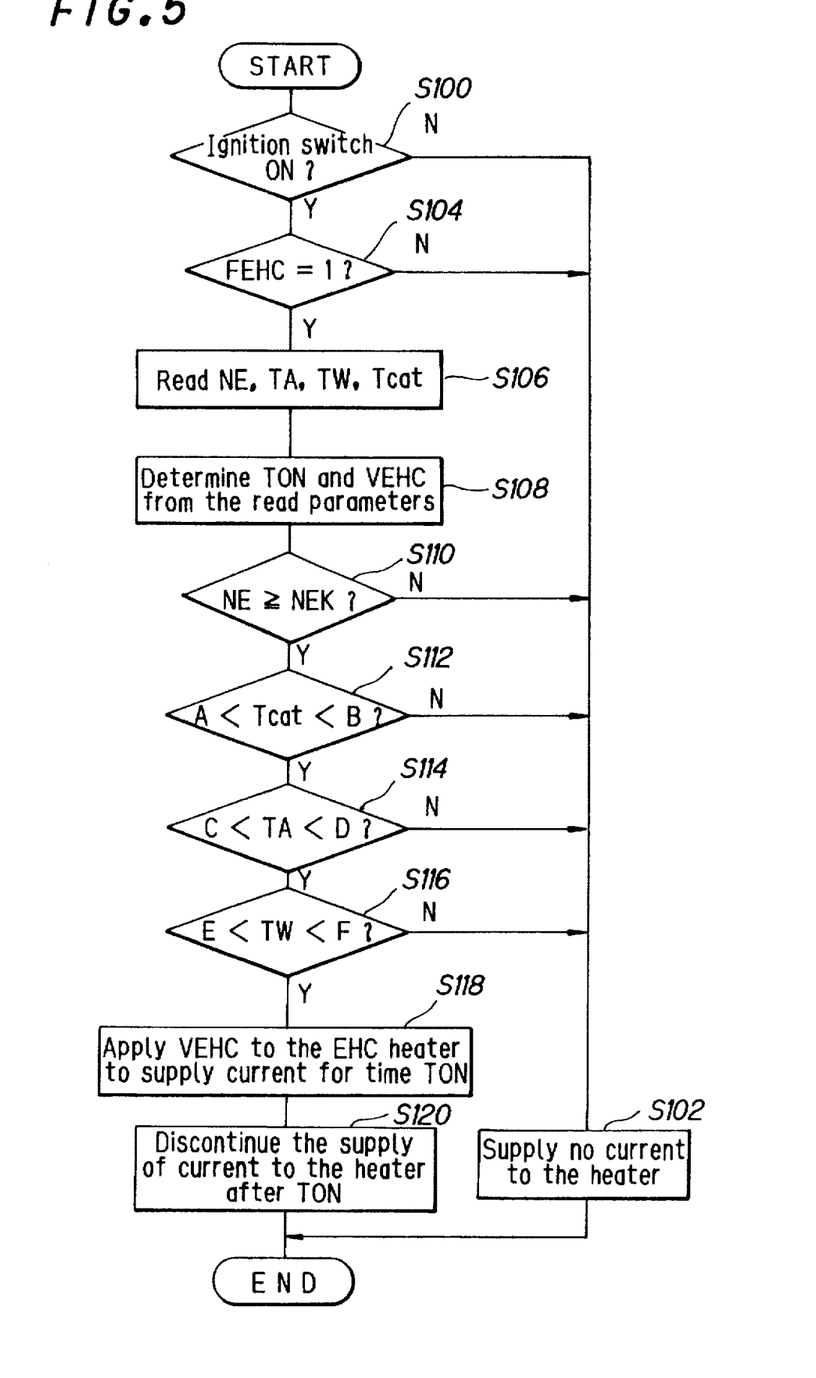
FIG. 5 is a flowchart showing the current supply control of the electrically heated catalytic converter illustrated in FIG. 1 using the flag whose bit is determined in the flowchart of FIG. 4.

Returning to the explanation of the FIG. 5 flowchart, the program then proceeds to S106 in which various engine operating parameters including the engine speed NE, the intake air temperature TA, the engine coolant temperature TW, and the exhaust system ambient temperature Tcat are read, and to S108 in which the time TON during which the current is to be supplied to the EHC 20 and the voltage VEHC to be applied to the EHC 20 are determined. The voltage VEHC is determined to be, for example, 30 V at cold engine starting.

Figure 6:
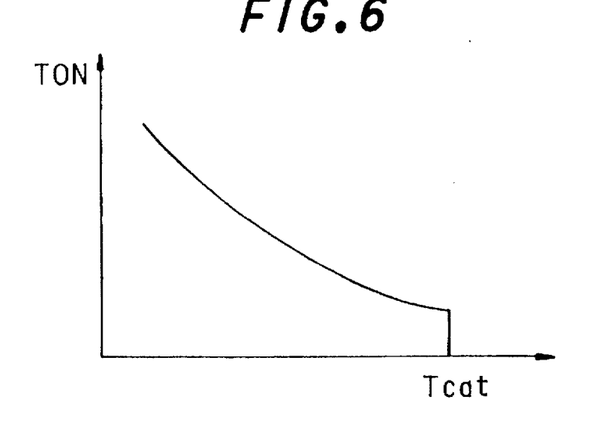
FIG. 6 is a graph showing the characteristics of the time TON during which current is supplied to the catalytic converter heater, determined with respect to the exhaust system ambient temperature Tcat and referred to in the flowchart of FIG. 5.
Figure 7:
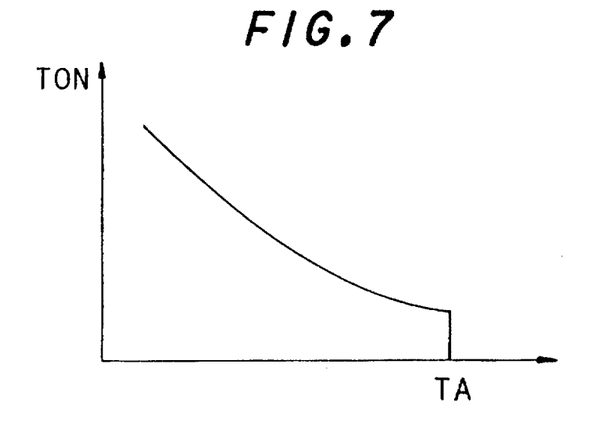
FIG. 7 is a graph showing the characteristics of the time TON during which current is supplied to the catalytic converter heater, determined with respect to the intake air temperature TA and referred to in the flowchart of FIG. 5.
Figure 8:
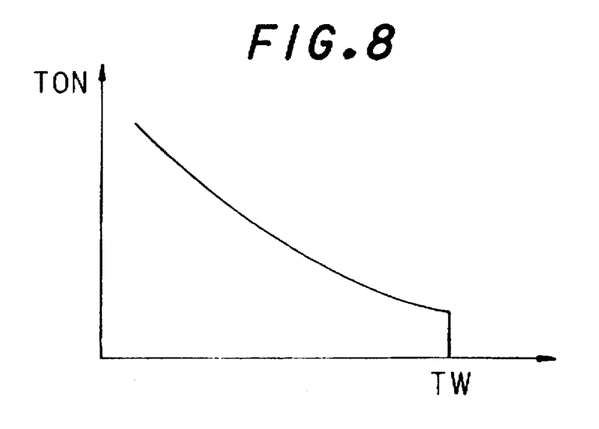
FIG. 8 is a graph showing the characteristics of the time TON during which current is supplied to the catalytic converter heater, determined with respect to the engine coolant temperature TW and referred to in the flowchart of FIG. 5.
Figure 9:
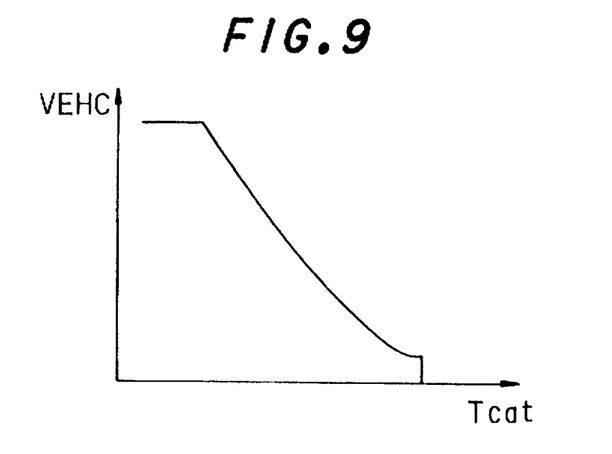
FIG. 9 is a graph showing the characteristics of the voltage VEHC to be applied to the catalytic converter heater, determined with respect to the exhaust system ambient temperature Tcat and referred to in the flowchart of FIG. 5.
Figure 10:
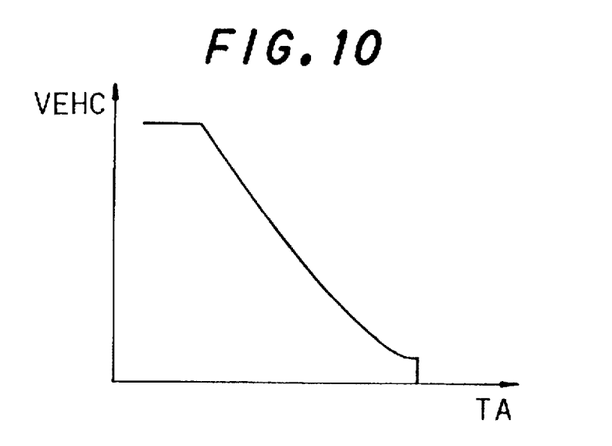
FIG. 10 is a graph showing the characteristics of the voltage VEHC to be applied to the catalytic converter heater, determined with respect to the intake air temperature TA and referred to in the flowchart of FIG. 5.
Figure 11:
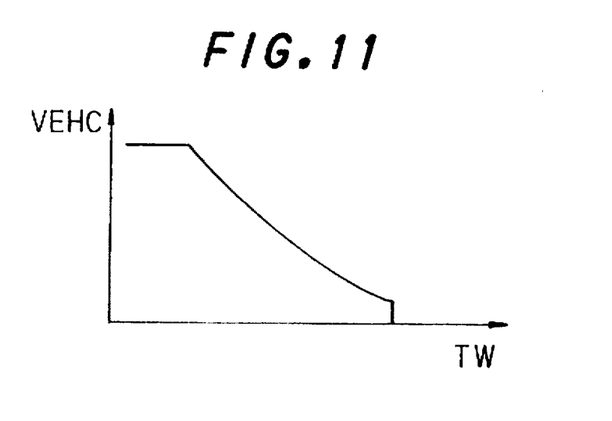
FIG. 11 is a graph showing the characteristics of the voltage VEHC to be applied to the catalytic converter heater, determined with respect to the engine coolant temperature TW and referred to in the flowchart of FIG. 5.

It should be noted here that the current supply time TON is determined, as illustrated in FIGS. 6 to 8, such that it decreases with increasing exhaust system ambient temperature Tcat, with increasing intake air temperature TA, or with increasing engine coolant temperature TW. Similarly, as illustrated in FIGS. 9 to 11, the voltage VEHC is also determined to be less as these temperatures rise.

The program then proceeds to S110 in which it is again checked whether the engine speed NE has reached a reference engine speed NEK (e.g. 400 rpm) indicating that the engine runs by itself without the aid of the cranking motor 17. If the result is affirmative, the program goes to S112 and to S116 via S114 in which it is respectively determined whether the exhaust system ambient temperature Tcat, the intake air temperature TA and the engine coolant temperature TW are within a range defined between values A and B, C and D or E and F, respectively.

When the results in these steps are all affirmative, the program proceeds to S118 in which the alternator 26 is switched to be connected with the EHC 20 (via the terminals 30a, 30b) and the alternator 26 is controlled, through the regulator 56, to generate the determined voltage VEHC and apply the voltage to the heater of the EHC 20 to produce the current that passes through the EHC heater. The program then advances to S120 in which the time is measured and when it has reached the time TON, the terminal 30a is switched to connect with the other terminal 30c to open the circuit and discontinue the current supply to the EHC heater.

On the other hand, when the result in any of S100, S104 and to S110 to S116 is negative, the program goes to S102 in which the current supply heater is inhibited or not performed. Although not shown in the flowchart, the air pump 34 is controlled to provide compressed air in the exhaust pipe 18 simultaneously with the current supply to the EHC heater.

Since the system is configured such that when the quantity of fuel injection is relatively great in the engine operation including engine warmup or engine starting, the current supply to the EHC 20 is inhibited or not performed. With the arrangement, it becomes possible to prevent the exhaust system ambient temperature from rising so high that the metal mesh 200 carrying the catalyst and/or the start catalytic converter 22 and the three-way catalytic converter 24 are degraded or damaged by the high temperature, preventing them from being degraded or damaged earlier.

Figure 4:
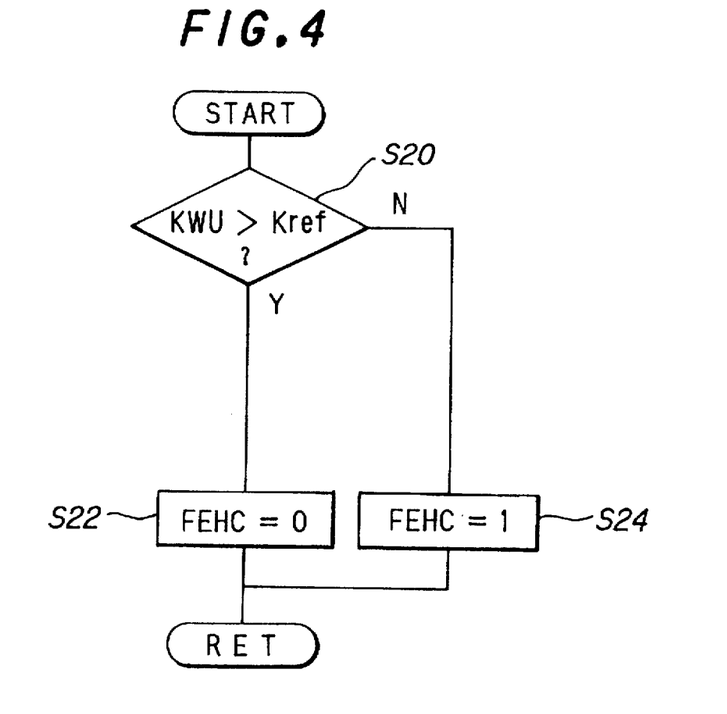
FIG. 4 is a flowchart showing the operation of the current supply control system according to the invention to determine whether the bit of a flag indicative of the current supply is to be inhibited or not.
Figure 12:
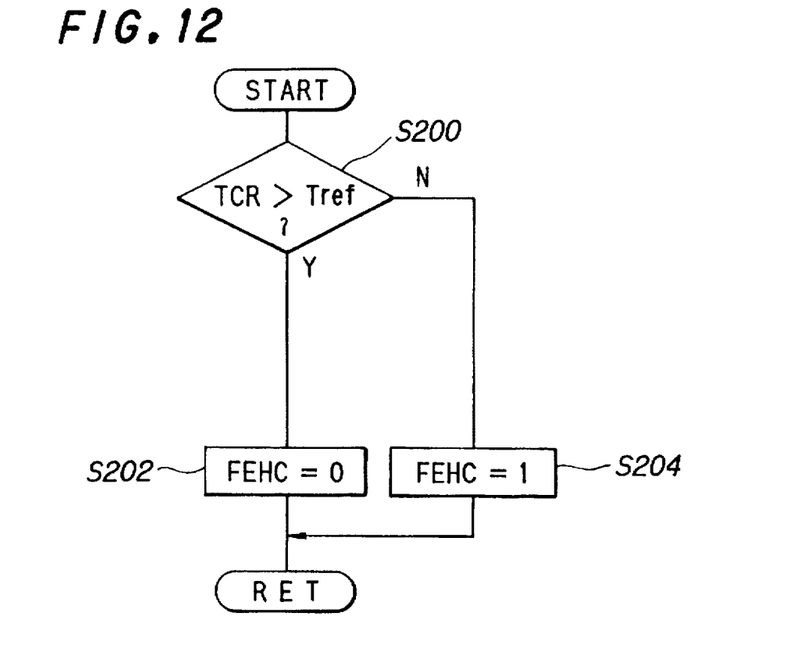
FIG. 12 is a flowchart, similar to FIG. 4, but showing the operation of the system according to a second embodiment of the invention.

FIG. 12 is a flowchart, similar to FIG. 4, but showing the operation of the system according to a second embodiment of the invention.

In the flowchart, the program starts at S200 in which it is checked whether a cranking time TCR during which the engine was in cranking is greater than a predetermined time Tref. The time TCR is obtained by measuring the time during which the engine speed NE is at or below the aforesaid reference engine speed NEK indicating that the engine runs by itself without the aid of the cranking motor 17. Alternatively, the time TCR is determined by measuring the time during which the cranking motor 17 is operative. When the result in S200 is affirmative, the program goes to S202 in which the bit of the flag FEHC is reset to zero indicating that the current supply to the heater of the EHC 20 is inhibited. On the other hand, when the result in S200 is negative, the program goes to S204 in which the bit of the flag FEHC is set to 1 indicating the current supply to the EHC heater is to be performed.

This is because if it takes a long time until the engine has been started, more unburned emissions will therefore be produced. With the arrangement, however, it becomes also possible to prevent the exhaust system ambient temperature from rising so high that the metal mesh 200 carrying the catalyst, and/or the start catalytic converter 22 and the three-way catalytic converter 24, are degraded or damaged by the high temperature, preventing them from being degraded or damaged earlier. The predetermined time Tref should be determined in a similar manner as the predetermined value Kref such that it is sufficient for discriminating the engine operation in which the exhaust system ambient temperature rises so high that the EHC 20, etc., are degraded or damaged.

Figure 13:
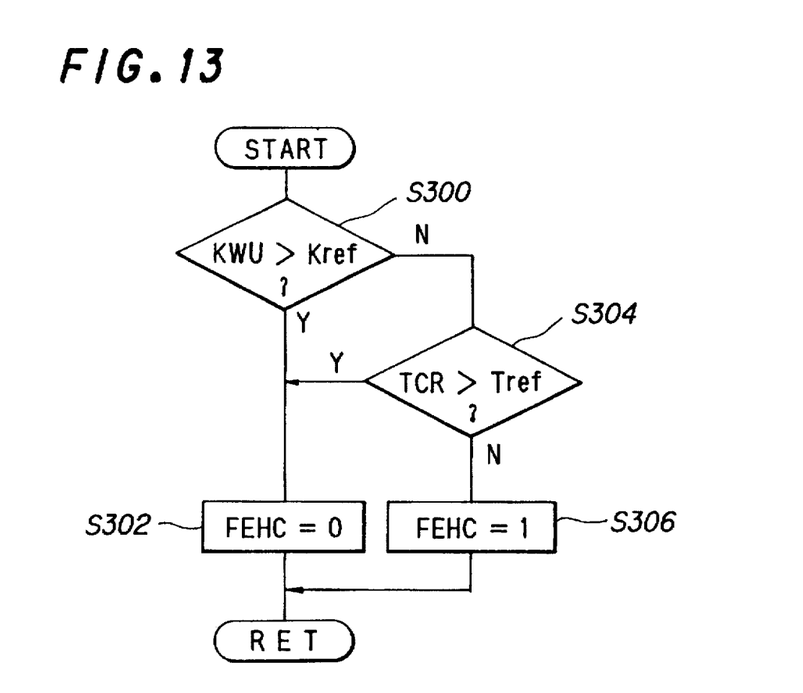
FIG. 13 is a flowchart, similar to FIG. 4, but showing the operation of the system according to a third embodiment of the invention.

FIG. 13 is a flowchart, similar to FIG. 4, but showing the operation of the system according to a third embodiment of the invention.

Explaining this, the program starts at S300 in which it is checked whether the engine warmup enrichment correction factor KWU is greater than the predetermined value Kref and if it is affirmative, the program goes to S302 in which the bit of the flag is reset to zero. If the result is negative, on the other hand, the program goes to S304 in which it is checked whether the engine cranking time TCR is greater than the predetermined time Tref, and if it is, the program goes to S302. If not, however, the program goes to S306 in which the bit of the flag FEHC is set to 1 indicating that the current supply to the EHC heater should be made.

The advantages of the third embodiment are the same as the foregoing embodiment.

It should be noted in the above that, although the engine warmup or engine starting are taken as an example of the engine operation under which the amount of fuel injection is increased, such an engine operation should not be limited to warmup or starting.

It should also be noted in the above that, although the total value or the general value of the correction factors are obtained as a product, it is alternatively possible to obtain it by addition to be compared with an appropriately set value. Further, when the correction factors are defined as addition terms, the total value will consequently be obtained as an addition value.

It should further be noted that, although the total value or general value of the correction factors is obtained to be compared with a predetermined value, it is alternatively possible to compare only one or some of the correction factors with an appropriately set value.

It should further be noted that it is alternatively possible to carry out the comparison in terms of the quantity of fuel injection. For example, it is possible to compare the output quantity of fuel injection Tout with an appropriately set value to determine whether the current supply to the EHC should be made.

It should further be noted that, although the EHC has been explained as being manufactured through extrusion, the EHC should not be limited to this type. Instead, it is alternatively possible to manufacture it in the shape of the so-called metal-wheel type, by winding a metal ribbon spirally.

Although the invention has thus been shown and described with reference to specific embodiments, it should be noted that the invention is in no way limited to the details of the described arrangements but changes and modifications may be made without departing from the scope of the invention, which is defined by the appended claims.

What is claimed is:

1. A system for controlling current supply to an electrically heated catalytic converter of an internal combustion engine, comprising:
   a catalytic converter installed in an exhaust system of the engine for reducing pollutants from exhaust gases emitted from the engine, the catalytic converter having a heater;

a power source;

current supplying means for connecting the power source to the heater of the catalytic converter to supply current thereto;

fuel injection quantity determining means for determining a basic quantity of fuel injection;

correction factor determining means for determining correction factors for correcting the basic quantity of fuel injection;

output fuel injection quantity determining means for determining an output quantity of fuel injection to be supplied to the engine based on the basic quantity of fuel injection and the correction factors;

discriminating means for discriminating whether at least one of the correction factors is greater than a predetermined value; and current supply inhibiting means for inhibiting the current supply to the heater of the catalytic converter when said at least one of the correction factors is greater than the predetermined value.

2. A system according to claim 1, wherein at least one of the correction factors is that for increasing the basic quantity of fuel injection when the engine is warming up.

3. A system according to claim 2, wherein at least one of the correction factors for increasing the basic quantity of fuel injection when the engine is warmed up is at least one from among factors due to an engine coolant temperature, an intake air temperature, and due to engine cranking.

4. A system according to claim 1, wherein at least one of the correction factors is at least one group of the correction factors for increasing the basic quantity of fuel injection when the engine is warming up.

5. A system for controlling current supply to an electrically heated catalytic converter of an internal combustion engine, comprising:

a catalytic converter installed in an exhaust system of the engine for reducing pollutants from exhaust gases emitted from the engine, the catalytic converter having a heater;

a power source;

current supplying means for connecting the power source to the heater of the catalytic converter to supply current thereto;

time measuring means for measuring time during which the engine is cranking;

discriminating means for discriminating whether the measured time is greater than a predetermined time; and current supply inhibiting means for inhibiting the current supply to the heater of the catalytic converter when the measured time is greater than the predetermined time.

6. A method for controlling current supply to an electrically heated catalytic converter of an internal combustion engine, having:

a catalytic converter installed in an exhaust system of the engine for reducing pollutants from exhaust gases emitted from the engine, the catalytic converter having a heater;

a power source; and current supplying means for connecting the power source to the heater of the catalytic converter to supply current thereto;

wherein the method comprises the steps of:
determining a basic quantity of fuel injection;
determining correction factors for correcting the basic quantity of fuel injection;
determining an output quantity of fuel injection to be supplied to the engine based on the basic quantity of fuel injection and the correction factors;
discriminating whether at least one of the correction factors is greater than a predetermined value; and
inhibiting the current supply to the heater of the catalytic converter when said at least one of the correction factors is greater than the predetermined value.

7. A method according to claim 6, wherein at least one of the correction factors is that for increasing the basic quantity of fuel injection when the engine is warming up.

8. A method according to claim 7, wherein at least one of the correction factors for increasing the basic quantity of fuel injection when the engine is warmed up is at least one from among the factors due to an engine coolant temperature, due to an intake air temperature, and due to engine cranking.

9. A method according to claim 6, wherein at least one of the correction factors is at least one group of the correction factors for increasing the basic quantity of fuel injection when the engine is warming up.

10. A method for controlling current supply to an electrically heated catalytic converter of an internal combustion engine, comprising:

a catalytic converter installed in an exhaust system of the engine for reducing pollutants from exhaust gases emitted from the engine, the catalytic converter having a heater;

a power source; and current supplying means for connecting the power source to the heater of the catalytic converter to supply current thereto;

wherein the method comprises the steps of:
measuring time during which the engine is cranking;
discriminating whether the measured time is greater than a predetermined time; and
inhibiting the current supply to the heater of the catalytic converter when the measured time is greater than the predetermined time.

11. A computer program for controlling current supply to an electrically heated catalytic converter of an internal combustion engine, having:

a catalytic converter installed in an exhaust system of the engine for reducing pollutants from exhaust gases emitted from the engine, the catalytic converter having a heater;

a power source; and current supplying means for connecting the power source to the heater of the catalytic converter to supply current thereto;

wherein the computer program comprises the steps of:
determining a basic quantity of fuel injection;
determining correction factors for correcting the basic quantity of fuel injection;
determining an output quantity of fuel injection to be supplied to the engine based on the basic quantity of fuel injection and the correction factors;
discriminating whether at least one of the correction factors is greater than a predetermined value; and
inhibiting the current supply to the heater of the catalytic converter when said at least one of the correction factors is greater than the predetermined value.

12. A computer program according to claim 11, wherein at least one of the correction factors is that for increasing the basic quantity of fuel injection when the engine is warming up.

13. A computer program according to claim 12, wherein at least one of the correction factors for increasing the basic quantity of fuel injection when the engine is warmed up is at least one from among the factors due to an engine coolant temperature, due to an intake air temperature, and due to engine cranking.

14. A computer program according to claim 11, wherein at least one of the correction factors is at least one group of the correction factors for increasing the basic quantity of fuel injection when the engine is warming up.

15. A computer program for controlling current supply to an electrically heated catalytic converter of an internal combustion engine, comprising:

a catalytic converter installed in an exhaust system of the engine for reducing pollutants from exhaust gases emitted from the engine, the catalytic converter having a heater;

a power source; and current supplying means for connecting the power source to the heater of the catalytic converter to supply current thereto;

wherein the computer program comprises the steps of:
measuring time during which the engine is cranking;
discriminating whether the measured time is greater than a predetermined time; and
inhibiting the current supply to the heater of the catalytic converter when the measured time is greater than the predetermined time.

* * * * *